United States Patent
Jha et al.

(10) Patent No.: US 12,050,185 B2
(45) Date of Patent: Jul. 30, 2024

(54) EXTERIOR AIRCRAFT LIGHT WITH COVER EROSION MONITORING, AIRCRAFT COMPRISING SUCH EXTERIOR AIRCRAFT LIGHT, AND METHOD OF MONITORING EROSION OF A LIGHT TRANSMISSIVE COVER

(71) Applicant: Goodrich Lighting Systems GmbH & Co. KG, Lippstadt (DE)

(72) Inventors: Anil Kumar Jha, Lippstadt (DE); Jens Leuschner, Möhnesee (DE); Andre Hessling von Heimendahl, Koblenz (DE); Marion Depta, Lippstadt (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 18/545,951

(22) Filed: Dec. 19, 2023

(65) Prior Publication Data

US 2024/0219318 A1    Jul. 4, 2024

(30) Foreign Application Priority Data

Jan. 3, 2023  (EP) .................... 23150120

(51) Int. Cl.
*B64D 47/06* (2006.01)
*F21S 43/20* (2018.01)
*F21W 107/30* (2018.01)
*G01N 21/958* (2006.01)

(52) U.S. Cl.
CPC .......... *G01N 21/958* (2013.01); *B64D 47/06* (2013.01); *F21S 43/26* (2018.01); *F21W 2107/30* (2018.01)

(58) Field of Classification Search
CPC ................................. B64D 2045/009
See application file for complete search history.

(56) References Cited

U.S. PATENT DOCUMENTS

| | | |
|---|---|---|
| 7,288,750 B2 | 10/2007 | Ewig et al. |
| 9,846,112 B2 | 12/2017 | Jha et al. |
| 10,151,708 B2 | 12/2018 | Hessling-Von Heimendahl et al. |
| 11,225,336 B2 | 1/2022 | Hessling-Von Heimendahl et al. |

(Continued)

FOREIGN PATENT DOCUMENTS

| | | |
|---|---|---|
| EP | 3812285 | 4/2021 |
| EP | 4082918 | 11/2022 |

OTHER PUBLICATIONS

European Patent Office; European Search Report dated Jan. 6, 2023 in EP Application No. 23150120.6.

*Primary Examiner* — Eric T Eide
(74) *Attorney, Agent, or Firm* — SNELL & WILMER L.L.P.

(57) ABSTRACT

An exterior aircraft light with cover erosion monitoring, the exterior aircraft light comprises: a support; at least one light source, arranged on the support; a light transmissive cover, arranged over the at least one light source, the light transmissive cover having a forward facing portion and a rearward facing portion; a first light sensor, arranged to receive light emitted by the at least one light source and reflected towards the first light sensor by the forward facing portion of the light transmissive cover; and a second light sensor, arranged to receive light emitted by the at least one light source and reflected towards the second light sensor by the rearward facing portion of the light transmissive cover.

15 Claims, 7 Drawing Sheets

(56) References Cited

U.S. PATENT DOCUMENTS

| | | |
|---|---|---|
| 2006/0249663 A1 | 11/2006 | Ewig et al. |
| 2016/0341655 A1* | 11/2016 | Jha ........................ B64D 47/02 |
| 2019/0144132 A1* | 5/2019 | Jha ........................ H05K 1/181 |
| | | 362/470 |
| 2019/0359348 A1* | 11/2019 | Pawliczek .............. B64D 47/04 |
| 2021/0122494 A1* | 4/2021 | Hessling-Von Heimendahl ......... |
| | | H05B 47/20 |
| 2022/0348354 A1* | 11/2022 | Hessling-von Heimendahl .......... |
| | | B64D 47/06 |

* cited by examiner

Fig. 8

EXTERIOR AIRCRAFT LIGHT WITH COVER EROSION MONITORING, AIRCRAFT COMPRISING SUCH EXTERIOR AIRCRAFT LIGHT, AND METHOD OF MONITORING EROSION OF A LIGHT TRANSMISSIVE COVER

CROSS-REFERENCE TO RELATED APPLICATIONS

This application claims priority to, and the benefit of, EP Patent Application No. 23150120.6, filed Jan. 3, 2023 and titled "EXTERIOR AIRCRAFT LIGHT WITH COVER EROSION MONITORING, AIRCRAFT COMPRISING SUCH EXTERIOR AIRCRAFT LIGHT, AND METHOD OF MONITORING EROSION OF A LIGHT TRANSMISSIVE COVER," which is incorporated by reference herein in its entirety for all purposes.

FIELD

The present invention relates to an exterior aircraft light, to an aircraft comprising such an exterior aircraft light, and to a method of monitoring erosion of a light transmissive cover of an exterior aircraft light.

BACKGROUND

Almost all aircraft are equipped with exterior aircraft lights. In particular, large passenger air planes are provided with a wide variety of exterior aircraft lights. The exterior aircraft lights are provided for a wide variety of different purposes, such as for allowing the passengers and/or air crew to view the outside, for passive visibility, for signaling purposes, etc. Examples of such exterior aircraft lights are navigation lights, also referred to as position lights, red-flashing beacon lights, white strobe anti-collision lights, wing scan lights, take-off lights, landing lights, taxi lights, runway turn-off lights, etc.

Exterior aircraft lights are exposed to very hazardous conditions. They have to withstand large aerodynamic forces, excessive particle impacts at high travelling velocities, as well as large temperature variations. The hazardous conditions, in particular the particle impacts at high travelling velocities, cause erosion of light transmissive covers of exterior aircraft lights. Erosion of the light transmissive cover may eventually degrade the light output of the exterior aircraft light in an unacceptable manner, leading to the exterior aircraft light no longer being considered airworthy. Up until now, erosion of light transmissive covers has been assessed mainly by highly subjective observations with naked eyes.

Accordingly, it would be beneficial to provide an exterior aircraft light with highly reliable integrated monitoring of the erosion of the light transmissive cover. Further, it would be beneficial to provide an aircraft with such an exterior aircraft light and to provide an according method of monitoring erosion of a light transmissive cover of an exterior aircraft light.

SUMMARY

Exemplary embodiments of the invention include an exterior aircraft light with cover erosion monitoring, the exterior aircraft light comprising: a support; at least one light source, arranged on the support; a light transmissive cover, arranged over the at least one light source, the light transmissive cover having a forward facing portion and a rearward facing portion; a first light sensor, arranged to receive light emitted by the at least one light source and reflected towards the first light sensor by the forward facing portion of the light transmissive cover; and a second light sensor, arranged to receive light emitted by the at least one light source and reflected towards the second light sensor by the rearward facing portion of the light transmissive cover; wherein the exterior aircraft light is configured to provide an indication regarding an extent of erosion of the light transmissive cover on the basis of sensor measurements of the first light sensor and sensor measurements of the second light sensor.

Exemplary embodiments of the invention allow for a highly reliable monitoring of the erosion of the light transmissive cover of an exterior aircraft light. As compared to previous approaches, the cover erosion monitoring does not rely on a human estimate of the erosion of the light transmissive cover. Rather, an automated monitoring of the light transmissive cover of the exterior aircraft light may become possible, with said automated monitoring having comparably low complexity, high ease of use, and high reliability. By monitoring the light, reflected by a forward facing portion of the light transmissive cover, and the light, reflected by a rearward facing portion of the light transmissive cover, a highly reliable monitoring of the erosion of the light transmissive cover may be achieved. Due to erosion predominantly or exclusively taking place at the forward facing portion of the light transmissive cover and due to the reflective action of the forward facing portion of the light transmissive cover increasing for light, coming from within the exterior aircraft light, the spread between the sensor measurements of the first light sensor and the sensor measurements of the second light sensor increases with erosion of the light transmissive cover.

Providing the indication regarding the extent of erosion of the basis of both the sensor measurements of the first light sensor and the sensor measurements of the second light sensor allows for a highly reliable determination of the extent of erosion. By comparing the sensor measurements of the first light sensor and the sensor measurements of the second light sensor, i.e. by comparing first sensor measurements that depend on erosion and second sensor measurements that are substantially independent of erosion of the light transmissive cover, the monitoring of the erosion of the light transmissive cover may be made substantially or even completely independent of other factors that may otherwise prevent accurate measurements. For example, an ambient light component of the sensor measurements may be present in both the sensor measurements of the first light sensor and of the second light sensor, and its disturbance of sensor measurements may be reduced or eliminated. As another example, a degradation of the at least one light source, such as an aging of LED light source(s), and/or a temporary reduction in light output due to a high operating temperature of the at least one light source may be present in both the sensor measurements of the first light sensor and of the second light sensor, and their disturbance of sensor measurements may be reduced or eliminated. A differential approach on the basis of sensor measurements of the first light sensor and sensor measurements of the second light sensor may provide for highly reliable results, while having a manageable complexity.

The exterior aircraft light is an exterior aircraft light with cover erosion monitoring, i.e. an exterior aircraft light with an integrated monitoring of the erosion of the light transmissive cover. It may also be said that an exterior aircraft light with cover erosion monitoring is an exterior aircraft light that has components for the monitoring of the erosion of the protective cover integrated into the exterior aircraft light. The exterior aircraft light has sensor and evaluation capacities to monitor the erosion of the light transmissive cover.

The exterior aircraft light is configured to provide an indication regarding an extent of erosion of the light transmissive cover on the basis of sensor measurements of the first light sensor and sensor measurements of the second light sensor. In particular, the exterior aircraft light may have a controller that is coupled to the first light sensor and to the second light sensor. Said controller may receive the sensor measurements of the first light sensor and the sensor measurements of the second light sensor and may have an evaluation logic to provide the indication regarding the extent of erosion of the light transmissive cover. The controller may further have a memory to store the sensor measurements of the first and second light sensors over time. The controller may be embodied in hardware or in a suitable combination of hardware and software.

The exterior aircraft light is configured to provide an indication regarding an extent of erosion of the light transmissive cover. The indication may be provided in the form of a signal that may be communicated to an entity outside of the exterior light, such as to a board computer of the aircraft. The signal may be communicated in a wired or wireless manner. It is also possible that the indication regarding the extent of erosion of the light transmissive cover is stored in the exterior aircraft light, such as in the memory of a controller of the exterior aircraft light, and may be read out via a suitable portable diagnostic device. It is further possible that the indication is given in a visual manner, such as via a status indication light source that is visible from outside the exterior aircraft light and that may for example be checked in the pre-flight routine. The indication regarding the extent of erosion of the light transmissive cover may be a quantitative indication regarding the extent of erosion. However, it is also possible that the indication is a binary indication, solely indicating whether the light transmissive cover is still considered airworthy or not.

The exterior aircraft light is configured to provide an indication regarding an extent of erosion of the light transmissive cover on the basis of sensor measurements of the first light sensor and sensor measurements of the second light sensor. In particular, the exterior aircraft light may be configured to relate the sensor measurements of the first light sensor to the sensor measurements of the second light sensor. Further in particular, said relating of the sensor measurements of the first light sensor and the sensor measurements of the second light sensor may take place over time. In that case, respective sensor measurements of the first and second light sensors, taken substantially at the same time, may be related. In this way, a time line regarding a relative behavior of the sensor measurements of the first light sensor and the sensor measurements of the second light sensor may be provided and may be used for evaluating the extent of erosion. With said comparative/relative approach of looking at the sensor measurements of the first light sensor and the sensor measurements of the second light sensor and with monitoring the development of the comparative/relative information over time, a highly reliable monitoring of the erosion of the light transmissive cover may be achieved. Details regarding different approaches for comparing/relating the sensor measurements of the first and second light sensors will be given below.

The exterior aircraft light has a light transmissive cover, arranged over the at least one light source. The light transmissive cover may be arranged over the at least one light source only or may be arranged over the support and the at least one light source. The light transmissive cover is a protective cover for the interior of the exterior aircraft light. In particular, the light transmissive cover may protect the interior of the exterior aircraft light from hazardous exhaust gases, from rain/snow, from excessive moisture, from particle impact caused by the impinging air stream during flight, and/or from impact of larger objects, such as birds. The light transmissive cover may be releasably mounted to the remainder of the exterior aircraft light, such that the light transmissive cover may be replaced when reaching an unacceptable extent of erosion or another type of major damage.

The exterior aircraft light has a first light sensor, arranged to receive light emitted by the at least one light source and reflected towards the first light sensor by the forward facing portion of the light transmissive cover. The forward facing portion of the light transmissive cover may be defined as that part of the light transmissive cover where the tangent to the outer surface of the light transmissive cover has an angle of more than 35° with respect to the impinging air stream during flight, i.e. an angle of more than 35° with respect to the forward flight direction. It has been found that most erosion takes place in this part of the light transmissive cover, i.e. in the part of the light transmissive cover where the impinging air stream hits the light transmissive cover in an orthogonal or substantially head-on manner.

The exterior aircraft light has a second light sensor, arranged to receive light emitted by the at least one light source and reflected towards the second light sensor by the rearward facing portion of the light transmissive cover. The rearward facing portion may be defined as that part of the light transmissive cover that is not exposed to an impinging air stream during flight. In particular, the rearward facing portion may be defined as that part of the light transmissive cover where the air stream is parallel to the tangent to the outer surface of the light transmissive cover, i.e. where the air stream passes along the outer surface of the light transmissive cover, or where the air stream detaches from the outer surface of the light transmissive cover, i.e. where the air stream diverges from the tangent to the outer surface of the light transmissive cover. For the example of fuselage-mounted light transmissive covers, the rearward facing portion may be the rear half of the light transmissive cover.

The light transmissive cover has a forward facing portion and a rearward facing portion. The forward and rearward facing portions may in particular be opposite portions of the light transmissive cover.

The exterior aircraft light has at least one light source, arranged on the support. The exterior aircraft light may have exactly one light source or may have a plurality of light sources. In the latter case, the light that is eventually received by the first light sensor and by the second light sensor does not have to come from all of the plurality of light sources nor from the same one or same ones of the plurality of light sources. In particular, it is possible that the light that is eventually received by the first light sensor originates from generally forward directed light source(s) and that the light that is eventually received by the second light sensor originates from generally rearward directed light source(s). The terminology that the exterior aircraft light has at least one light source, that the light sensor is arranged to receive light emitted by the at least one light source and reflected towards the first light sensor by the forward facing portion of the light transmissive cover, and that the second light sensor is arranged to receive light emitted by the at least one light source and reflected towards the second light sensor by the rearward facing portion of the light transmissive cover is not meant to imply a restriction regarding which particular light source emits the light that is eventually received by the respective light sensors.

The at least one light source may be at least one LED. In particular, each of the at least one light source may be an LED.

The first/second light sensor is arranged to receive light emitted by the at least one light source and reflected towards the first/second light sensor by the forward/rearward facing portion of the light transmissive cover. The first light sensor may be said to be oriented towards the forward facing portion of the light transmissive cover, and the second light sensor may be said to be oriented towards the rearward facing portion of the light transmissive cover. This terminology is not meant to imply that the first/second light sensor only receives light emitted by the at least one light source and reflected directly towards the first/second light sensor. Rather, the first and second light sensors may also pick up other light, such as ambient light, stray light within the exterior aircraft light, etc. However, with the provision of the first and second light sensors and their orientation towards the forward and rearward facing portions of the light transmissive cover, it may be possible to monitor the erosion of the light transmissive cover largely independent from such disturbing light components.

According to a further embodiment, the exterior aircraft light is configured to provide the indication regarding the extent of erosion of the light transmissive cover on the basis of ratio values of the sensor measurements of the first light sensor and the sensor measurements of the second light sensor. Determining the indication regarding the extent of erosion on the basis of ratio values may provide for a particularly effective way of eliminating disturbing factors that affect the sensor measurements of the first and second light sensors in the same or similar manner. For example, ratio values may be particularly effective in reducing or eliminating the influence of ambient light and/or stray light within the exterior aircraft light and/or light source degradation and/or light output reduction due to high operating temperatures of the light source(s) and/or other factors that may be detrimental to the measurement accuracy between the first and second sensors and/or detrimental to the comparability of measurement values over time.

According to a further embodiment, the exterior aircraft light is configured to provide a worn cover indication when the ratio values of the sensor measurements of the first light sensor and the sensor measurements of the second light sensor are above a worn cover threshold value. The worn cover indication may indicate that the light transmissive cover of the exterior aircraft light is to be replaced at the next possible time, such as at the next scheduled maintenance or at an extra-curricular maintenance. The worn cover threshold value may correspond to an extent of erosion at which the exterior aircraft light is no longer considered airworthy. It is also possible that the worn cover threshold value indicates an extent of erosion at which the exterior aircraft light is still considered airworthy, but not far away from no longer being considered airworthy. In this way, the worn cover indication may provide for a timely planning of a replacement of the light transmissive cover.

According to a further embodiment, the exterior aircraft light is configured to provide the worn cover indication when the ratio values of the sensor measurements of the first light sensor and the sensor measurements of the second light sensor are on average above the worn cover threshold value within a predetermined erosion monitoring time interval. In this way, outside conditions that temporarily make the provision of meaningful sensor measurements impossible may be prevented from triggering a worn cover event. Examples of such conditions may be snow or excessive icing on the light transmissive cover, bird feces on the light transmissive cover, excessive dirt from exhaust gases on the light transmissive cover, etc.

According to a further embodiment, the exterior aircraft light is configured to provide the worn cover indication when at least a predefined percentage of the ratio values of the sensor measurements of the first light sensor and the sensor measurements of the second light sensor are above the worn cover threshold value within a predetermined erosion monitoring time interval. Said predefined percentage may be 70% or 80% or 90% or 95% or another suitable percentage value. This binning of ratio values with respect to the worn cover threshold value may be employed as an alternative or additional means for preventing a wrong triggering of the worn cover event, as compared to the monitoring of the average described above.

The erosion monitoring time interval may cover a predetermined time interval from a momentary point in time into the past. In other words, the erosion monitoring time interval may be a moving window with respect to the sensor measurements taken over time, i.e. a moving window with respect to the time series of sensor measurements generated by the first and second light sensors.

According to a further embodiment, the predetermined erosion monitoring time interval is between 1 week and 3 months. In particular, the predetermined erosion monitoring time interval may be between 2 weeks and 2 months. The given time intervals have been found to provide a good trade-off between obtaining a highly reliable determination regarding the extent of erosion of the light transmissive cover, while reacting to the process of erosion of the light transmissive cover in an adequate time frame.

According to a further embodiment, the worn cover threshold value is between 1.5 and 4. This worn cover threshold value is applied under the assumption that the ratio value of the sensor measurements of the first light sensor and the sensor measurements of the second light sensor is normalized at 1, when the exterior aircraft light is put into service, i.e. when the light transmissive cover is in a non-eroded state. The given value range has been found to provide a particularly reliable determination of a worn light transmissive cover, i.e. of a light transmissive cover that is to be serviced/maintained/replaced, while maintaining a long service life of the light transmissive cover.

According to a further embodiment, the exterior aircraft light is configured to provide the indication regarding the extent of erosion of the light transmissive cover on the basis of difference values of the sensor measurements of the first light sensor and the sensor measurements of the second light sensor. Evaluating difference values of the sensor measurements of the first light sensor and sensor measurements of the second light sensor may also provide for a highly effective way of monitoring the state of erosion of the light transmissive cover of the exterior aircraft light. In particular, evaluating difference values may also allow for reducing or eliminating an undesired disturbance of the sensor measurements by ambient light, stray light within the exterior aircraft light, light source degradation, temporary light output reduction due to high operating temperatures of the light source(s), etc. The additional features, modifications, and effects, as described above with respect to the usage of ratio values, may be applied to the indication regarding the extent of erosion of the light transmissive cover on the basis of difference values in an analogous manner.

According to a further embodiment, the exterior aircraft light further comprises: a first shutter, arranged over the first light sensor, wherein the first shutter has a first light entry port oriented towards the forward facing portion of the light transmissive cover; and/or a second shutter, arranged over the second light sensor, wherein the second shutter has a second light entry port oriented towards the rearward facing portion of the light transmissive cover. In this way, the influence of disturbing light components, such as ambient light, stray light within the exterior aircraft light, etc., on the sensor measurements of the first and second light sensors may be kept particularly low. A particularly high reliability in determining the extent of erosion of the light transmissive cover may be achieved.

According to a further embodiment, the first shutter encloses the first light sensor, with the exception of the first light entry port, and/or the second shutter encloses a second light sensor, with the exception of the second light entry port.

According to a further embodiment, the first light sensor and/or the second light sensor are arranged on the support. In this way, the at least one light source, the first sensor, and the second light sensor may be jointly supported by the support. The support may be a circuit board, in particular a printed circuit board (PCB). In this way, the support may provide the mechanical support for the at least one light source and the first and/or second light sensors and may provide the electric connections for the at least one light source and the first and/or second light sensors. The controller of the exterior aircraft light may also be arranged on the support. Other electric components of the exterior aircraft light, such as a status indication light source, may also be arranged on the support.

According to a further embodiment, the exterior aircraft light is configured to provide an indication regarding an extent of degradation of the at least one light source on the basis of sensor measurements of the second light sensor. In particular, the exterior aircraft light may be configured to provide an indication regarding aging/long term degradation of the at least one light source on the basis of sensor measurements of the second light sensor. The aging/long term degradation of the at least one light source may be due to thermal and/or electric stresses over time. As the sensor measurements of the second light sensor are largely or fully independent of the erosion of the light transmissive cover, the sensor measurements of the second light sensor may allow for a highly reliable determination of the degradation of the at least one light source. In order to make said determination largely or fully independent of other variables, such as different levels of ambient light, it is possible to obtain the sensor measurements for the indication regarding an extent of degradation under laboratory conditions, e.g. by placing a cover/hood over the exterior aircraft light. It is also possible to compare the lowest sensor measurements within respective degradation monitoring time intervals over time. It may be assumed that, within each degradation monitoring time interval, there is at least one instance of an operation of the exterior aircraft light under well-defined environmental conditions, such as a night flight. The degradation monitoring time interval may be between 1 week and 3 months, in particular between 2 weeks and 2 months. With the described set-up, it may be possible to carry out an erosion monitoring of the light transmissive cover and a degradation monitoring of the at least one light source with two sensors only. As compared to previous approaches, which used three sensors for providing the two functionalities, the sensor capacities may be reduced by 33%.

According to a further embodiment, the exterior aircraft light is a fuselage-mounted aircraft beacon light. The aircraft beacon light may be a red-flashing aircraft beacon light, such as an aircraft beacon light with red light sources that emit sequences of red light flashes in operation. The terminology of the exterior aircraft light being a fuselage-mounted aircraft beacon light means that the exterior aircraft light is configured/adapted to be mounted to the fuselage of an aircraft.

The fuselage-mounted aircraft beacon light may have a bowl-shaped/cup-shaped light transmissive cover. The light transmissive cover may have another suitable shape, such as teardrop shape, as well. With these kinds of shapes of the light transmissive cover, the forward facing portion and the rearward facing portion of the light transmissive cover may be conveniently positioned on opposite sides of the light transmissive cover in the longitudinal direction of the fuselage of the aircraft. Accordingly, such fuselage-mounted aircraft beacon lights may provide for ample room for providing and suitably orienting the first and second light sensors.

According to a further embodiment, the exterior aircraft light comprises a plurality of light sources, arranged on the support. In particular, the plurality of light sources may be arranged in an annular configuration on the support, and the first light sensor and the second light sensor may be arranged laterally outwards of the annular configuration of the plurality of light sources. The annular arrangement of the plurality of light sources may be particularly suitable for fuselage-mounted aircraft beacon lights. The plurality of light sources, the first light sensor, and the second light sensor may in particular be arranged in a rotationally symmetric arrangement.

According to a further embodiment, the exterior aircraft light comprises an optical system for shaping the desired exterior aircraft light output, such as the desired beacon light output, from the light emitted by the at least one light source/by the plurality of light sources. The optical system may comprise one or more lenses and/or one or more reflectors and/or one or more shutters. In a particular embodiment, the optical system may comprise a unitary lens structure that is arranged over the plurality of light sources and, optionally, over the first and second light sensors and that is rotationally symmetric with respect to the center axis of the annular configuration of the plurality of light sources.

According to a further embodiment, the exterior aircraft light is a wing-end-mounted exterior aircraft light. When mounted to the end of a wing, an exterior aircraft light may take over part of the forward lighting functionalities and part of the rearward lighting functionalities of an exterior aircraft lighting system. The light transmissive cover of such an exterior aircraft light may be a three-dimensional structure, in particular a three-dimensional structure having a substantially semi-circular or semi-elliptical horizontal cross-section. In this way, the light transmissive cover may have a forward facing portion and a rearward facing portion that are highly suitable for implementing the erosion monitoring described herein.

According to a further embodiment, the wing-end-mounted exterior aircraft light is a wing-end-mounted aircraft navigation light or a wing-end-mounted red-flashing beacon light or a wing-end-mounted white strobe anti-collision light or a wing-end-mounted multi-function light providing the functionalities of two or all of an aircraft navigation light, a red-flashing beacon light, and a white strobe anti-collision light.

Exemplary embodiments of the invention further include an aircraft, comprising at least one exterior aircraft light in accordance with any of the embodiments described above. The aircraft may be an airplane or a rotorcraft. The additional features, modifications, and effects, as described above with respect to the exterior aircraft light, apply to the aircraft in an analogous manner.

According to a further embodiment, the aircraft comprises an upper fuselage-mounted aircraft beacon light, as described in any of the embodiments above, mounted to an upper portion of a fuselage of the aircraft, and/or a lower fuselage-mounted aircraft beacon light, as described in any of the embodiments above, mounted to a lower portion of the fuselage of the aircraft.

Exemplary embodiments of the invention further include a method of monitoring erosion of a light transmissive cover of an exterior aircraft light having at least one light source, the method comprising: obtaining first sensor measurements with a first light sensor, the first light sensor arranged to receive light emitted by the at least one light source and reflected by a forward facing portion of the light transmissive cover; obtaining second sensor measurements with a second light sensor, the second light sensor arranged to receive light emitted by the at least one light source and reflected by a rearward facing portion of the light transmissive cover; relating the first sensor measurements and the second sensor measurements; and providing an indication regarding an extent of erosion of the light transmissive cover on the basis of said relating of the first sensor measurements and the second sensor measurements. The additional features, modifications and effects, as described above with respect to the exterior aircraft light, apply to the method of monitoring erosion of a light transmissive cover in an analogous manner.

According to a further embodiment, said relating of the first sensor measurements and the second sensor measurements comprises determining ratio values of the first sensor measurements and the second sensor measurements.

According to a further embodiment, the method comprises providing a worn cover indication when the ratio values are above a worn cover threshold value.

BRIEF DESCRIPTION OF THE DRAWINGS

Further exemplary embodiments of the invention are described below with respect to the accompanying drawings, wherein.

DETAILED DESCRIPTION

Figure 1:
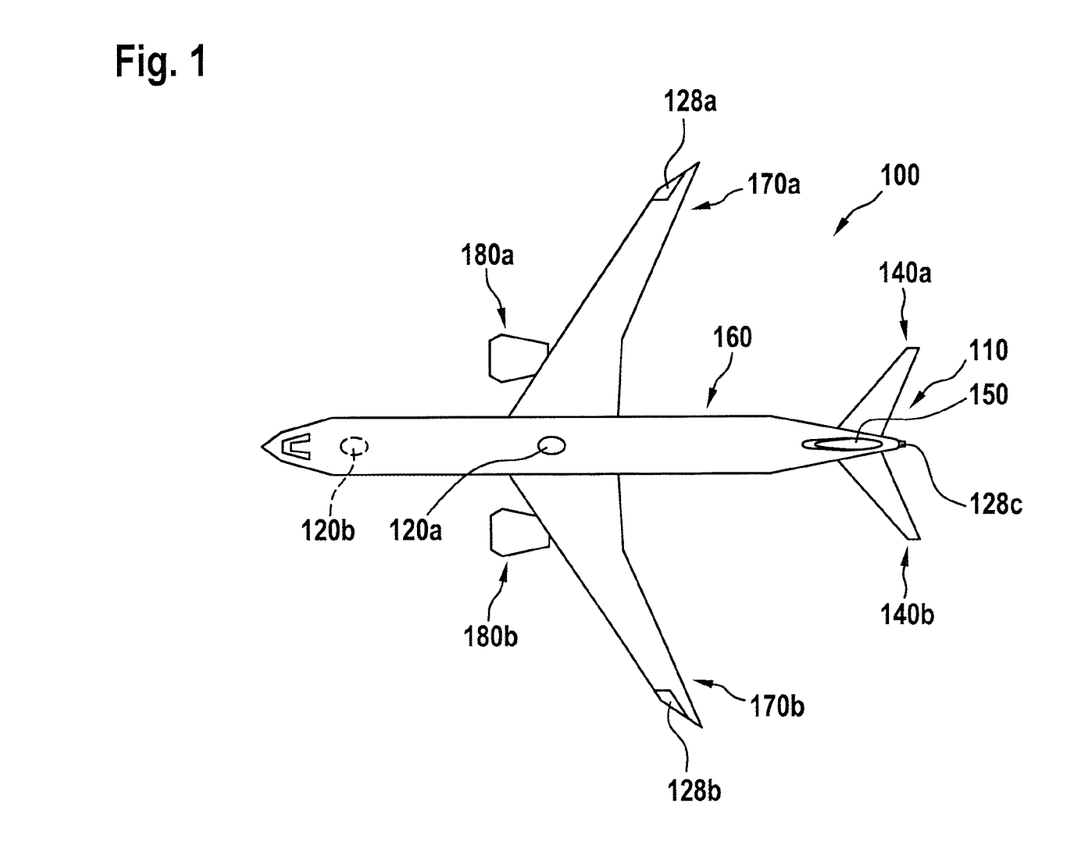
FIG. 1 shows a schematic top view of an aircraft according to an exemplary embodiment of the invention, which is equipped with two aircraft beacon lights according to exemplary embodiments of the invention.
Figure 2:
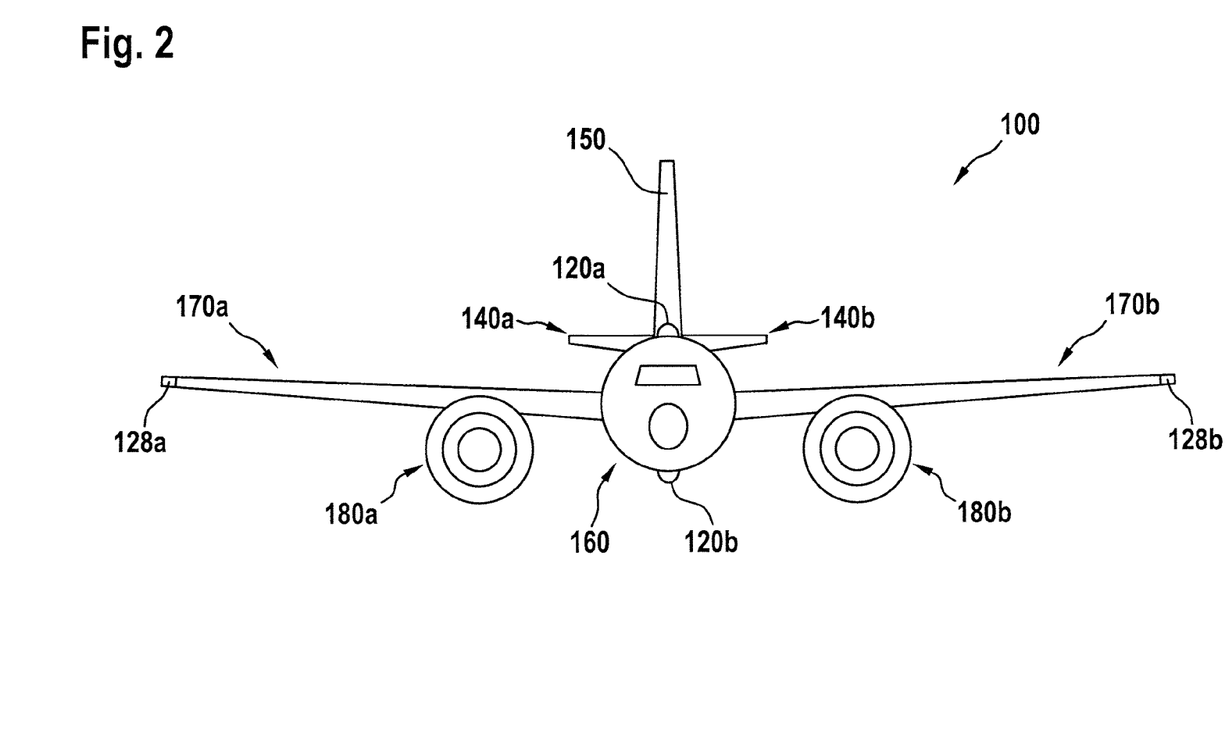
FIG. 2 shows a schematic front view of the aircraft shown in FIG. 1.

FIG. 1 shows a schematic top view of an aircraft 100 according to an exemplary embodiment of the invention. In the exemplary embodiment of FIG. 1, the aircraft is a commercial passenger airplane 100. FIG. 2 shows a schematic front view of the aircraft 100.

The aircraft 100 comprises a fuselage 160 and two wings 170a, 170b extending laterally from the fuselage 160. A respective engine 180a, 180b is attached to each of the wings 170a, 170b. The aircraft 100 further comprises two horizontal stabilizers 140a, 140b and a vertical stabilizer 150, which are mounted to an aft portion of the fuselage 160.

The aircraft 100 is equipped with a variety of exterior aircraft lights.

Out of all the exterior aircraft lights, which may be provided at the exterior of the aircraft 100, only three white strobe anti-collision lights 128a, 128b, and 128c and two red-flashing beacon lights 120a, 120b are depicted in FIGS. 1 and 2. The air-craft 100 may be equipped with additional exterior lights, which may in particular include at least one or any subset or all of navigation lights, logo lights, wing scan lights, engine scan lights, cargo loading lights, take-off lights, taxi lights, landing lights, and/or runway turn-off lights. For clarity and simplicity of illustration and description, these additional types of exterior lights are not depicted in FIGS. 1 and 2. It is, however, pointed out that the white strobe anti-collision lights 128a, 128b, and 128c may be combined aircraft navigation and white strobe anti-collision lights. In this case, the exterior aircraft light 128a would provide a white strobe anti-collision light output and a green navigation light output, the exterior aircraft light 128b would provide a white strobe anti-collision light output and a red navigation light output, and the exterior aircraft light 128c would provide a white strobe anti-collision light output and a white navigation light output.

The aircraft 100 shown in FIGS. 1 and 2 is equipped with an upper red-flashing beacon light 120a, which is installed in an upper portion of the aircraft 100, in particular on top of the fuselage 160. In an alternative configuration, the upper red-flashing beacon light 120a may be installed in an upper portion of the vertical stabilizer 150, in particular on top of the vertical stabilizer 150.

The aircraft 100 further comprises a lower red-flashing beacon light 120b, which is installed in a lower portion of the aircraft 100. The lower red-flashing beacon light 120b may in particular be mounted to the bottom of the fuselage 160.

Although only one lower red-flashing beacon light 120b is depicted in FIGS. 1 and 2, the aircraft 100 may comprise two or more lower red-flashing beacon lights, which may be installed at different positions along the longitudinal extension of the fuselage 160. A first lower red-flashing beacon light may, for example, be mounted to a front portion of the fuselage 160 close to the front gear of the aircraft 100, and a second lower red-flashing beacon light may, for example, be mounted to a middle portion of the fuselage 160 close to the main gear of the aircraft 100 and/or to an aft portion of the fuselage below the horizontal and vertical stabilizers 140*a*, 140*b*, 150.

In alternative configurations, red-flashing beacon lights may be installed at the tips of the wings 170*a*, 170*b* and at the tail 110 of the aircraft 100, potentially supplemented by red-flashing beacon lights on the side walls of the fuselage 160 and/or on the bottom of the fuselage 160.

In the exemplary embodiments of FIGS. 1 and 2, the upper red-flashing beacon light 120*a* and the lower red-flashing beacon light 120*b* are exterior aircraft lights in accordance with exemplary embodiments of the invention. An exemplary embodiment of such fuselage-mounted aircraft beacon lights is described below with respect to FIGS. 3 to 7.

Commonly, the red-flashing beacon lights 120*a*, 120*b* are switched on when the engines 180*a*, 180*b* are started, such that the emitted sequences of red light flashes may help to inform and warn ground personnel in the vicinity of the aircraft 100 that the engines 180*a*, 180*b* have been started.

As mentioned, the aircraft 100 is equipped with three white strobe anti-collision lights 128*a*, 128*b*, and 128*c*. First and second white strobe anti-collision lights 128*a*, 128*b* are installed in the wings 170*a*, 170*b*, in particular in the respective tips of the wings 170*a*, 170*b*. A third white strobe anti-collision light 128*c* is installed at the tail 110 of the aircraft 100.

The white strobe anti-collision lights 128*a*, 128*b*, 128*c* emit respective sequences of white light flashes during normal operation of the aircraft 100. It is also possible that the white strobe anti-collision lights 128*a*, 128*b*, 128*c* are only operated during the night and in bad weather conditions.

Figure 3:
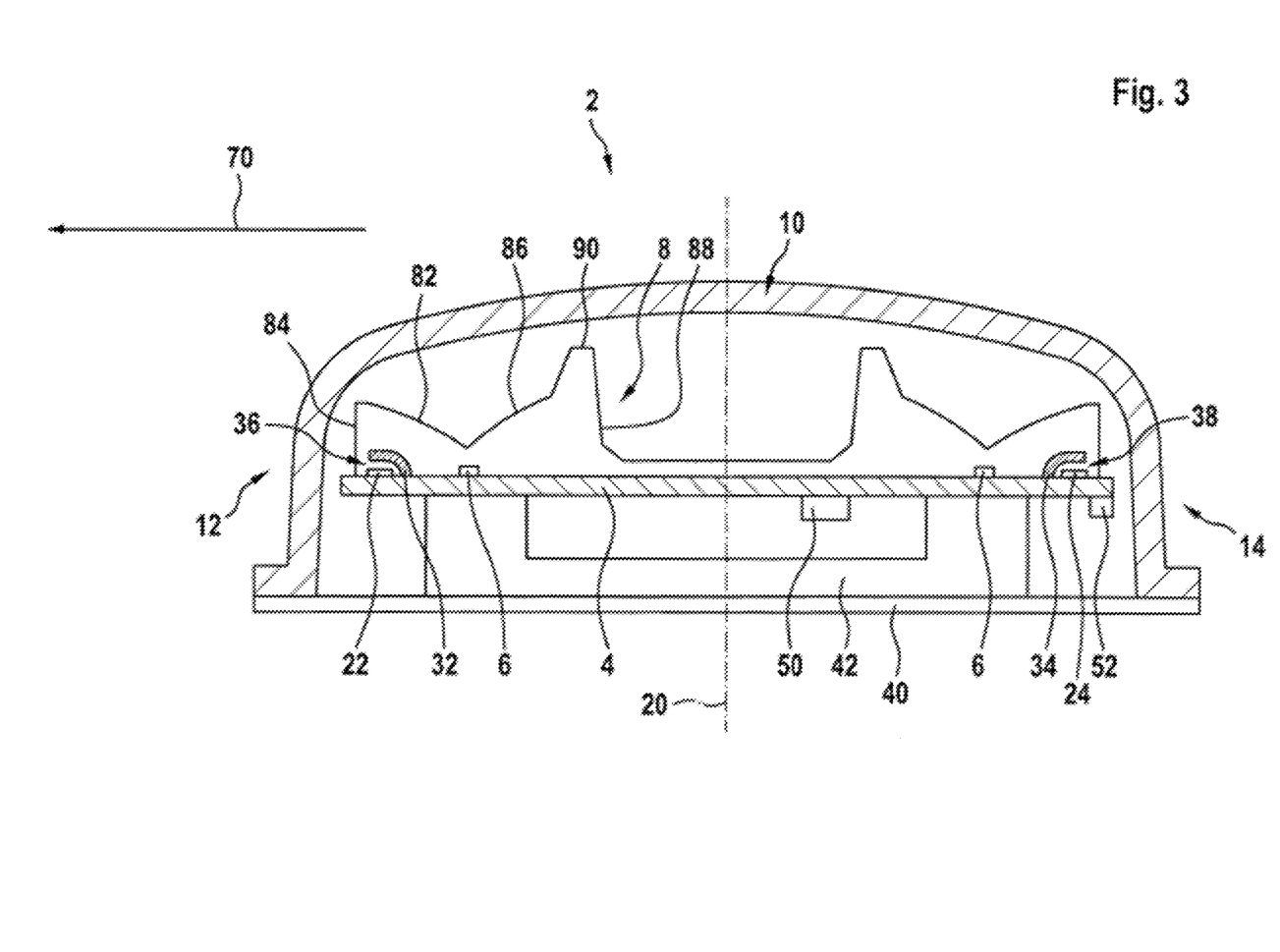
FIG. 3 shows a schematic vertical cross-sectional view of an exterior aircraft light in accordance with an exemplary embodiment of the invention.

FIG. 3 shows a schematic vertical cross-sectional view of an exterior aircraft light according to an exemplary embodiment of the invention. In the exemplary embodiment of FIG. 3, the exterior aircraft light is a fuselage-mounted aircraft beacon light 2. The aircraft beacon light 2 may for example be employed as the upper air-craft beacon light 120*a* and/or as the lower aircraft beacon light 120, depicted in FIGS. 1 and 2.

The aircraft beacon light 2 of FIG. 3 has a mounting portion 40, which is configured for mounting the aircraft beacon light 2 to the aircraft 100, in particular to the fuselage 160 of the aircraft 100, as it is depicted in FIGS. 1 and 2.

The aircraft beacon light 2 further comprises a disk-shaped support 4. The support 4 has a central portion. A plurality of light sources 6 are arranged on the support 4 around the central portion of the support 4. The plurality of light sources 6 may in particular be arranged in an annular configuration around the central portion of the support 4, with two of said plurality of light sources 6 being depicted in the cross-sectional view of FIG. 3. The light sources 6 may be LEDs.

The support 4 is in turn supported by a support structure 42, which is arranged between the mounting portion 40 and the support 4. The mounting portion 40 may be formed integrally with the support structure 42. The support structure 42 provides mechanical support to the support 4. It may further provide a cooling structure and a cooling space for transferring heat, which is generated by the plurality of light sources 6 in operation, away from the plurality of light sources 6.

Figure 4:
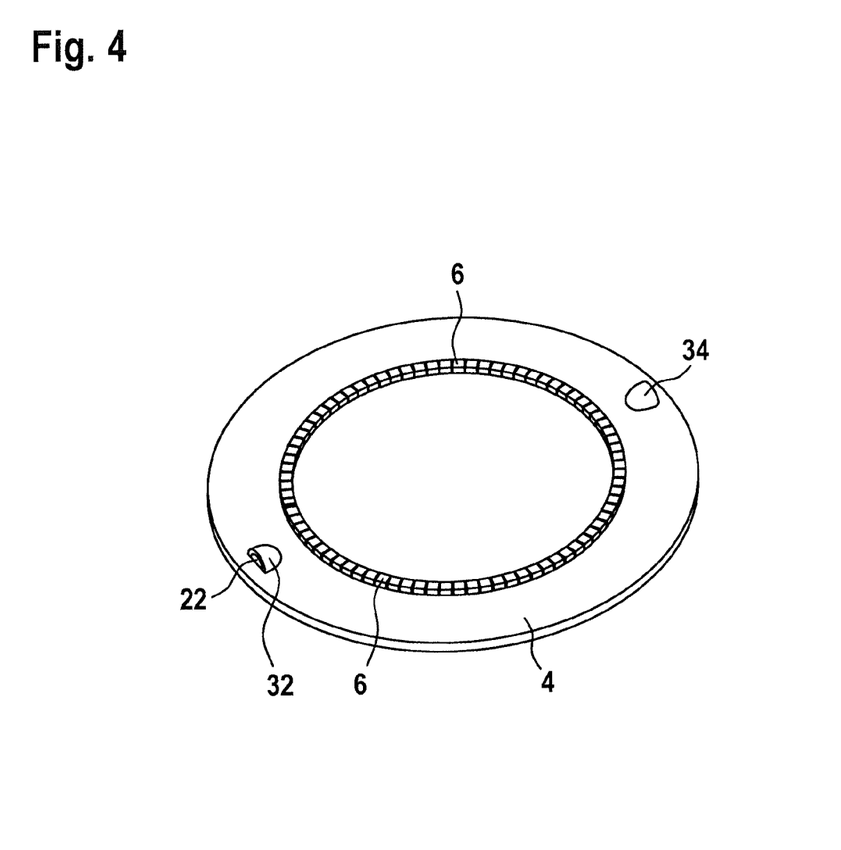
FIG. 4 shows a schematic perspective view of selected components of the exterior aircraft light of FIG. 3.

FIG. 4 shows a schematic perspective view of selected components of the air-craft beacon light 2 of FIG. 3. FIG. 4 depicts the disc-shaped support 4 and the annular configuration of light sources 6 in a perspective view. Various components of the aircraft beacon light 2 of FIGS. 3 and 4 have rotational symmetry with respect to a central axis of symmetry 20. In particular, the support 4 and the annular configuration of light sources 6 have rotational symmetry.

The vertical cross-sectional view of FIG. 3 is a longitudinal cross-sectional view through the aircraft beacon light 2. The cross-sectional view of FIG. 3 may in particular be taken along the longitudinal axis of the fuselage of the aircraft, when the aircraft beacon light 2 is mounted to the fuselage. In other words, the cross-sectional view of FIG. 3 is a longitudinal cross-sectional view in the aircraft frame of reference. The forward flight direction of the aircraft is indicated via arrow 70 in FIG. 3.

In the exemplary embodiment of FIGS. 3 and 4, the plurality of light sources 6 are arranged in a circular manner around the axis of symmetry 20. The plurality of light sources 6 are in particular arranged between the central portion of the support 4 and a circumferential periphery of the support 4. It is pointed out that other arrangements of light sources are possible as well. It is also possible that only one light source is present. Said one light source may for example be provided in the central portion of the support 4.

In the exemplary embodiment of FIGS. 3 and 4, the plurality of light sources 6 are red LEDs. Optionally, the plurality of light sources 6 may comprise a combination of red LEDs and white LEDs and/or infrared LEDs. It is also possible that the plurality of light sources 6 are white LEDs and a red color filter is provided in the aircraft beacon light 2.

The aircraft beacon light 2 further comprises a lens structure 8. The lens structure 8 is arranged and configured for forming a beacon light output from the light emitted by the plurality of light sources 6. The lens structure 8 is shown in FIG. 3, but not in FIG. 4.

In the exemplary embodiment of FIG. 3, the lens structure 8 is a unitary, rotationally symmetric component, which is arranged within the aircraft beacon light 2 for conditioning the light output of the aircraft beacon light 2. The lens structure 8 is arranged over the plurality of light sources 6. The lens structure 8 may be made from silicone or from PMMA or from another suitable material, and it may be molded over the plurality of light sources 6 onto the support 4. In other words, during manufacture, the material of the lens structure 8 may be brought into its eventual shape in a molding process right over the plurality of light sources 6 and the support 4. It is also possible that the lens structure 8 is molded as a separate element, which is later attached to the support 4, enclosing the plurality of light sources 6 between the support 4 and the lens structure 8.

The lens structure 8 is a rotationally symmetric component and has various annular optical surfaces, which will be described in detail below. The cross-sectional view of FIG. 3 shows two mirror-symmetrical portions of the lens structure 8 towards the left and towards the right of the central portion of the support 4. It is understood that the individual surfaces and portions of the lens structure 8, which will be described below, extend around the central portion of the support 4 in a revolving manner. It is further understood that the lens structure 8 may or may not be continuous through the central portion of the support 4 and may thus cover a large portion of the support 4.

The lens structure 8 has a light entry surface, which is the boundary surface with respect to the plurality of light sources 6, a first total internal reflection surface 82, which is distal from the support 4 and positioned laterally outwards of the plurality of light sources 6, a second total internal reflection surface 86, which is distal from the support 4 and positioned laterally inwards of the plurality of light sources 6, a first light exit surface 84, which is substantially orthogonal to the support 4 and forms the laterally outermost part of the lens structure 8, and a second light exit surface 88, which is close to orthogonal with respect to the support 4 and which is positioned between the plurality of light sources 6 and the central portion of the support 4, i.e. laterally inwards of the plurality of the light sources 6 and the second total internal reflection surface 86.

In addition, the lens structure 8 of the exemplary embodiment of FIG. 3 comprises a refractive portion 90, which forms the most distal part of the lens structure 8 with respect to the support 4 and which is arranged between the second light exit surface 88 and the second total internal reflection surface 86, when considering the distance from the axis of symmetry 20. The optical effects of the various surfaces and portions of the lens structure 8 will be described below with respect to FIG. 5.

The aircraft beacon light 2 further comprises a light transmissive cover 10, which is also shown in FIG. 3, but not in FIG. 4. The light transmissive cover 10 is mounted to the mounting portion 40 and forms an inner space between the mounting portion 40 and the light transmissive cover 10. The support 4, the plurality of light sources 6, and the lens structure 8 are arranged in said inner space. The light transmissive cover 10 protects the lens structure 8, the plurality of light sources 6, and the support 4 during flight of the aircraft and on the ground.

The light transmissive cover 10 may be made from a transparent, color-less material, such as PMMA. The light transmissive cover 10 may also be made from an-other suitable material. In case white light sources are used for providing a red beacon light output, the light transmissive cover 10 may comprise a red color filter or may be made from a red, light transmissive material.

In the exemplary embodiment of FIG. 3, the light transmissive cover 10 is bowl-shaped/cup-shaped and encloses the support 4, the plurality of light sources 6, and the lens structure 8. The light transmissive cover 10 has a forward facing portion 12 and a rearward facing portion 14. In the cross-sectional view of FIG. 3, the forward facing portion 12 and the rearward facing portion 14 are depicted as substantially straight line portions of the light transmissive cover 10. It is understood that the forward facing portion 12 and the rearward facing portion 14 are extended portions of the light transmissive cover 10 around the front end and around the rear end of the light transmissive cover 10.

The aircraft beacon light 2 further comprises a first light sensor 22, a first shutter 32, a second light sensor 24, and a second shutter 34. The first light sensor 22 and the first shutter 32 are arranged at a forward end portion of the support 4. The second light sensor 24 and the second shutter 34 are arranged at a rearward end portion of the support 4. The first light sensor 22, the first shutter 32, the second light sensor 24, and the second shutter 34 are depicted in cross-section in FIG. 3 and in a three-dimensional view in FIG. 4, wherever visible in the viewing direction of FIG. 4.

The first light sensor 22 is arranged to receive light emitted by one or more of the plurality of light sources 6 and reflected by the forward facing portion 12 of the light transmissive cover 10. The first shutter 32 is shaped and arranged to enclose the first light sensor 22, with the exception of a first light entry port 36. The first shutter 32 contributes to the orientation of the first light sensor 22 towards the forward facing portion 12 of the light transmissive cover 10. In other words, the first shutter 32 helps that the first light sensor 22 predominantly senses light that arrives from the forward facing portion 12 of the light transmissive cover 10.

The second light sensor 24 is arranged to receive light emitted by one or more of the plurality of light sources 6 and reflected by the rearward facing portion 14 of the light transmissive cover 10. The second shutter 34 is shaped and arranged to enclose the second light sensor 24, with the exception of a second light entry port 38. The second shutter 34 contributes to the orientation of the second light sensor 24 towards the rearward facing portion 14 of the light transmissive cover 10. In other words, the second shutter 34 helps that the second light sensor 24 predominantly senses light that arrives from the rearward facing portion 14 of the light transmissive cover 10.

The first shutter 32 and the second shutter 34 may have a low profile on top of the support 4. In this way, the first shutter 32 and the second shutter 34 may disturb/block the beacon light output of the aircraft beacon light 2 to a low degree or not at all. In a particular embodiment, the first shutter 32 and the second shutter 34 extend from the support 4 by at most 5 mm, in particular by at most 3 mm. The extension from the support 4 is understood as the extension in the dimension orthogonal to the support 4.

In the exemplary embodiment of FIG. 3, the lens structure 8 is molded over the first light sensor 22, the first shutter 32, the second light sensor 24, and the second shutter 34. In other words, the first light sensor 22, the first shutter 32, the second light sensor 24, and the second shutter 34 are enclosed by the transparent lens structure 8. It is also possible that the first light sensor 22, the first shutter 32, the second light sensor 24, and the second shutter 34 are arranged outside of the lens structure 8, for example laterally outwards of the lens structure 8.

With the first light sensor 22 and the second light sensor 24, the erosion of the light transmissive cover 10, in particular the erosion of the forward facing portion 12 of the light transmissive cover 10, can be monitored. Exemplary details of such monitoring will be described below with respect to FIGS. 6 and 7.

The aircraft beacon light 2 further comprises a controller 50. In the exemplary embodiment of FIG. 3, the controller 50 is arranged on the support 4, in particular arranged on a back side of the support 4. The controller 50 may also be provided in or at the support structure 42. The controller 12 may also be provided in other locations in the aircraft beacon light 2.

The controller 50 is coupled to the plurality of light sources 6. The controller 50 is configured for effecting a pulsed power supply to the plurality of light sources 6 in operation. In this way, the plurality of light sources 6 may provide for a red-flashing beacon light output of the aircraft beacon light 2.

The controller 50 may be coupled to an on-board power supply network or to an according power adapter (not shown), and it may pass on the received electric power to the plurality of light sources 6. The controller 50 may be embodied entirely in hardware or it may comprise a suitable combination of hardware and software for achieving the desired control of the plurality of light sources 6.

The controller 50 is further coupled to the first light sensor 22 and to the second light sensor 24. The controller 50 is configured to evaluate the sensor measurements of the first light sensor 22 and the second light sensor 24. In particular, the controller 50 is configured to determine an extent of erosion of the light transmissive cover 10 by relating the sensor measurements of the first light sensor 22 and the sensor measurements of the second light sensor 24. Details of said determination will be described below with respect to FIGS. 6 and 7.

Once the controller 50 has determined that the light transmissive cover has de-graded to an unacceptable extent, herein also referred to as a worn cover event, the controller 50 may control a status indication LED 52 to provide a visual indication of the worn cover event. For example, the status indication LED 52 may be a yellow LED and the controller 50 may control the status indication LED 52 to light up when the aircraft is on the ground. With the status indication LED 52 being arranged at a rear end of the support 4 and being visible through the light transmissive cover 10, the visual indication regarding the worn cover event may become apparent to ground personal and/or crew members that do a pre-flight check or a regular comprehensive aircraft check after a certain number of operating hours or a full aircraft check in the course of scheduled maintenance. As an alternative/in addition to providing the visual indication via the status indication LED 52, the controller 50 may transmit a worn cover signal to an outside entity, such as to the aircraft board computer and/or to a portable diagnostic device, via a suitable wired or wire-less communication channel.

Figure 5:
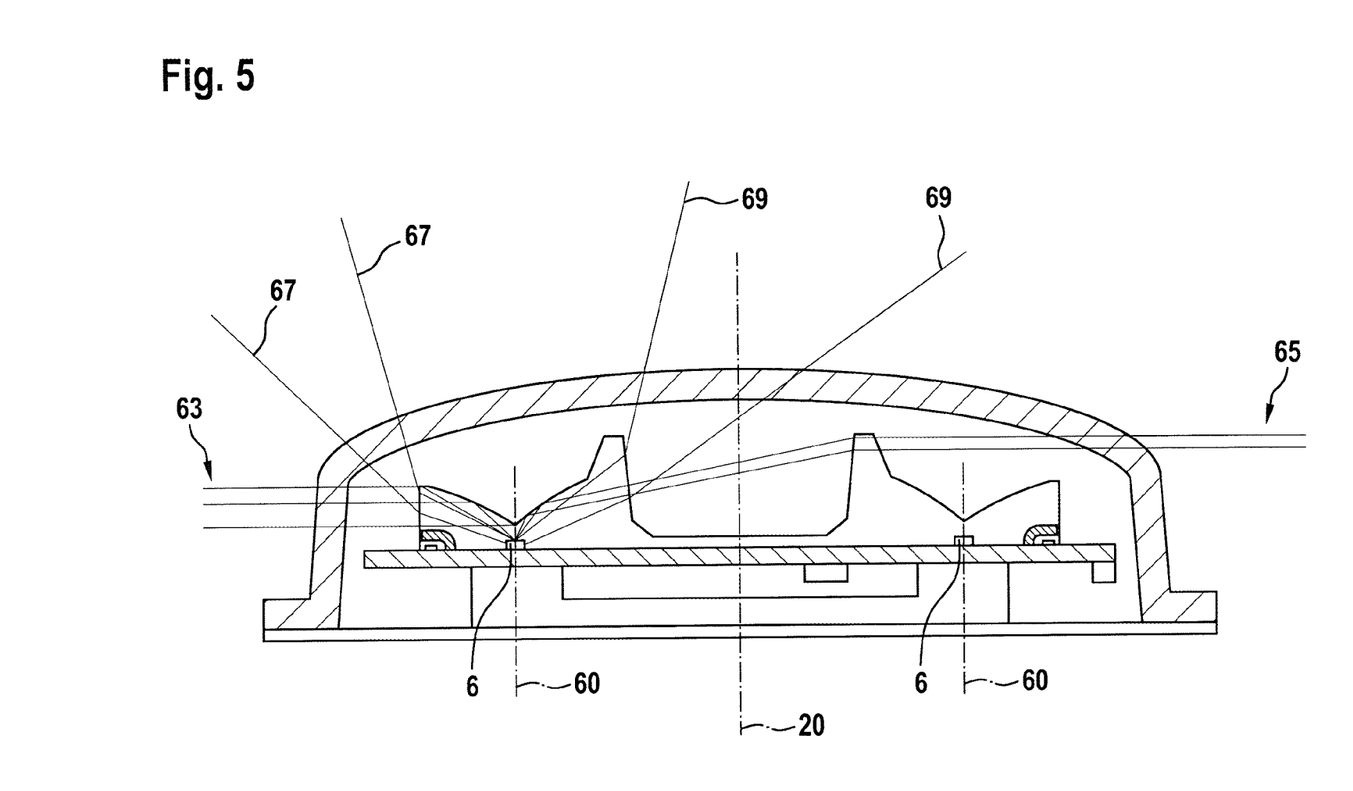
FIG. 5 shows the exterior aircraft light of FIG. 3 in the same cross-sectional view, with exemplary light rays illustrating the light output of the exterior aircraft light.

FIG. 5 shows the aircraft beacon light 2 of FIG. 3 in the same cross-sectional view. FIG. 5 additionally shows exemplary light rays 63, 65, 67, 69, as emitted by the light source 6 depicted on the left hand side of FIG. 4. For enhancing the clarity of the illustration, no light rays emitted by the light source 6 on the right hand side of FIG. 4 are shown.

In order to draw better attention to the exemplary light rays 63, 65, 67, 69, the reference numerals to the individual surfaces and portions of the lens structure 8 are omitted from FIG. 5. It is pointed out that the reference numerals of FIG. 3 ap-ply to FIG. 5 in complete analogy.

For ease of illustration, the principal light emission directions 60 of the light sources 6 are indicated as dashed lines in FIG. 5, with the principal light emission directions 60 being oriented orthogonal to the support 4. The light sources 6 are directed light sources, with the principal light emission direction 60 extending orthogonal to the support 4.

A first portion of the light, emitted by the light sources 6, enters the lens structure right after exiting the light sources 6, reaches the first total internal reflection sur-face 82, experiences total internal reflection at the first total internal reflection sur-face 82, and is reflected laterally outwards. The exemplary light rays 63, which il-lustrate said first portion of light, hit the first light exit surface 84 in an orthogonal manner and, therefore, pass the first light exit surface 84 without further refraction.

While being reflected laterally outwards, the first portion of light is collimated in a direction parallel to the support 4, i.e. it is collimated within the horizontal plane in the aircraft frame of reference. For achieving said collimation, the first total internal reflection surface 82 has a parabolic shape in cross-section, as illustrated in FIGS. 3 and 5. The first portion of light encompasses the light as output by the plurality of light sources 6 in an angular range of about 45° between the principal light emission directions 60 and 45° laterally outwards thereof.

A second portion of light enters the lens structure 8 from the plurality of light sources 6, reaches the second total internal reflection surface 86, experiences total internal reflection at the second total internal reflection surface 86, and exits the lens structure 8 for a first time at the second light exit surface 88. The second portion of light is illustrated via exemplary light rays 65.

The second total internal reflection surface 86 is also parabolic. However, the parabolic shape is tilted in such a way with respect to the support 4 that the exemplary light rays 65 are not collimated parallel to the support 4, but somewhat angled up-wards with respect to the support 4. The exemplary light rays 65 of the second portion of light experience an additional refraction at the second light exit surface 88. The second portion of light, after passing the second light exit surface 88, re-enters the optical structure 8 at the refractive portion 90. The refractive portion 90 refracts the second portion of light to be parallel or close to parallel with respect to the support 4. In this way, the second portion of light is also emitted in or close to the horizontal plane of the aircraft 100 in the aircraft frame of reference. The second portion of light encompasses the light as output by the plurality of light sources 6 in an angular range of about 30° between the principal light emission directions 60 and 30° laterally inwards thereof.

A third portion of light emitted by the light sources 6, which is illustrated by exemplary light rays 67, enters the lens structure 8 after being emitted by the light sources 6 and propagates right to the first light exit surface 84. There, the third portion of light is refracted into various angular directions. The third portion of light encompasses the light as output by the plurality of light sources 6 in an angular range of about 45° between 45° laterally outwards of the principal light emission directions 60 and parallel to the support 4.

A fourth portion of light, which is illustrated by exemplary light rays 69, enters the lens structure 8 after being emitted by the light sources 6 and propagates right to the second light exit surface 88 and the refractive portion 90. There, the fourth portion of light experiences refraction into various angular regions. The fourth portion of light encompasses the light as output by the plurality of light sources 6 in an an-gular range of about 60° between 30° laterally inwards of the principal light emission directions 60 and parallel to the support 4.

With the given lens structure 8, a highly efficient fulfilling of the FAR requirements for aircraft beacon lights 2, requiring a high intensity peak in the horizontal plane in the aircraft frame of reference and requiring a decreasing intensity for larger angles with respect to the horizontal plane, can be achieved.

The total internal reflection at the first and second total internal reflection surfaces 82, 86 may allow for providing the peak in the horizontal plane in a particularly space-efficient and energy-efficient manner. As compared to other approaches, where complex optical systems, based on metallic reflectors, were used, an FAR-compliant beacon light output may be achieved with up to 80% reduction in beacon light volume and up to 60% reduction in height over the fuselage 104. In this way, aerodynamic drag can be reduced, and the exposure to damaging particles and larger objects, such as birds, can be reduced.

It is, however, explicitly pointed out that the formation of the beacon light output may also be achieved with other optical structure designs and that exemplary embodiments of the present invention may also employ such other optical structure designs.

Figure 6:
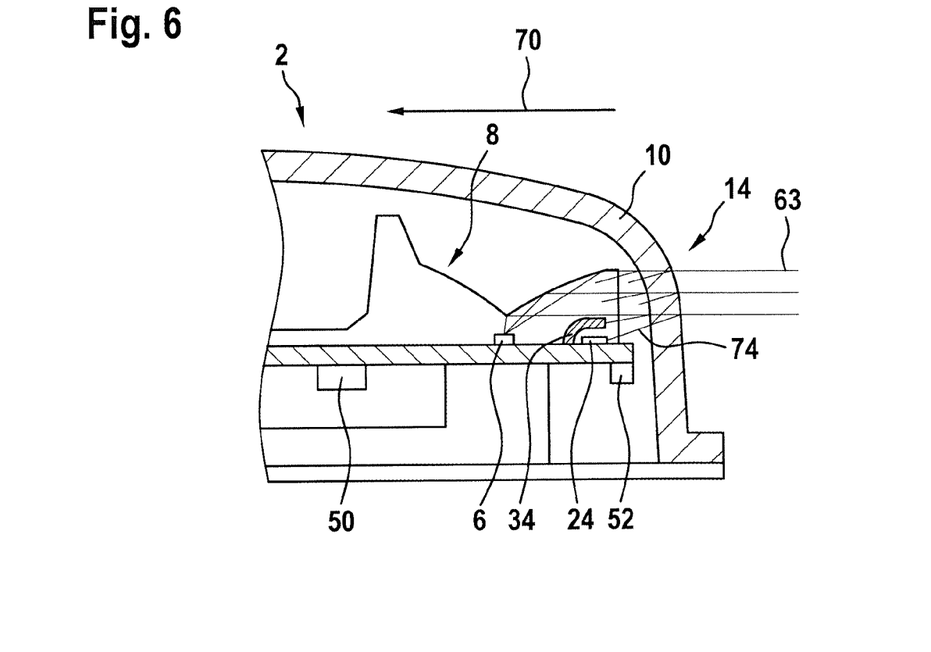
FIG. 6 shows an enlarged version of a rear portion of the exterior aircraft light of FIG. 3 in the same cross-sectional view, with exemplary light rays illustrating part of the light sensing for monitoring erosion of the light transmissive cover.

FIG. 6 shows an enlarged version of a rear portion of the aircraft beacon light 2 of FIG. 3 in the same cross-sectional view, with exemplary light rays illustrating part of the light sensing for monitoring erosion of the light transmissive cover 10. In particular, FIG. 6 shows that portion of the aircraft beacon light 2 that is depicted to-wards the right of the central axis of symmetry 20 in FIG. 3.

As described with respect to FIG. 5, a first portion of light, as emitted by the plurality of light sources 6, leaves the aircraft beacon light 2 substantially parallel with respect to the support 4. As in FIG. 5, said first portion of light is illustrated via exemplary light rays 63. When examining said first portion of light closely, not all of the light passes through the rearward facing portion 14 of the light transmissive cover 10 in an unimpeded manner. A small fraction of the first portion of light experiences Fresnel reflection at the outer surface of the light transmissive cover 10. This reflection may be due to surface imperfections at the inner and outer surfaces of the light transmissive cover 10 and/or due to non-perfect collimation of the first portion of light and a reflection of angled light rays on the light transmissive cover 10 and/or due to other factors. Part of said small fraction of the first portion of light reaches the second light sensor 24 and gives rise to sensor measurements at the second light sensor 24. This part of light is indicated with reference numeral 74 in FIG. 6.

The rearward facing portion 14 of the light transmissive cover 10 is not hit by an impinging air stream in operation. Therefore, the rearward facing portion 14 of the light transmissive cover 10 does not experience erosion or only a minimal amount of erosion in use. When, hypothetically, assuming the light output of the plurality of light sources 6 to be constant and when, hypothetically, assuming a constant amount of ambient light, the sensor measurements of the second light sensor 24 would stay substantially constant over time. In other words, the sensors measurements of the second light sensor 24 reflect the fact that only minimal or no erosion takes place at the rearward facing portion 14 of the light transmissive cover 10.

Figure 7:
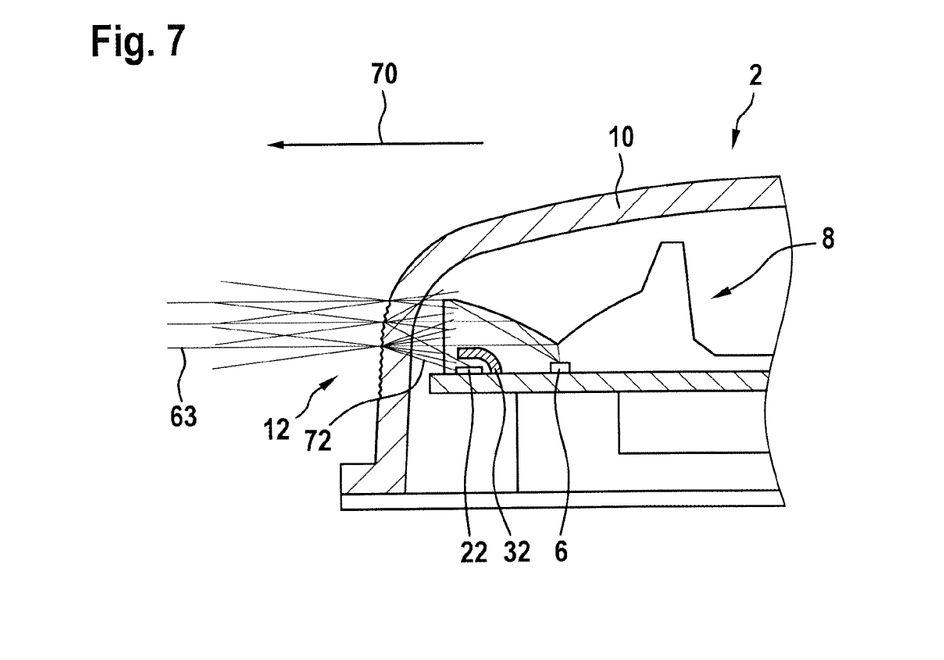
FIG. 7 shows an enlarged version of a front portion of the exterior aircraft light of FIG. 3 in the same cross-sectional view, with exemplary light rays illustrating part of the light sensing for monitoring erosion of the light transmissive cover.

FIG. 7 shows an enlarged version of a front portion of the aircraft beacon light 2 of FIG. 3 in the same cross-sectional view, with exemplary light rays illustrating part of the light sensing for monitoring erosion of the light transmissive cover 10. In particular, FIG. 7 shows that portion of the aircraft beacon light 2 that is depicted towards the left of the central axis of symmetry 20 in FIG. 3.

As described with respect to FIG. 5, a first portion of light, as emitted by the plurality of light sources 6, leaves the aircraft beacon light 2 substantially parallel with respect to the support 4. However, said highly collimated light output through the forward facing portion 12, substantially in parallel with the support 4, only takes place, as long as the light transmissive cover 10 is in a non-eroded state. When the forward facing portion 12 of the light transmissive cover 10 has experienced some erosion, as it is depicted in FIG. 7, the outer surface of the forward facing portion 12 of the light transmissive cover 10 takes on a complex shape in terms of its optical properties. While some light still passes the forward facing portion 12 straight, some light experiences refraction at various angles, and some light experiences reflection at various angles. Part of the latter portion of light, i.e. part of the portion of light being reflected at the outer surface of the forward facing portion 12 of the light transmissive cover 10, reaches the first light sensor 22 and gives rise to sensor measurements at the first light sensor 22. This part of light is indicated with reference numeral 72 in FIG. 7.

Over the course of time and with an ongoing erosion of the forward facing portion 12 of the light transmissive cover 10, the portion of light that is reflected at the outer surface of the forward facing portion 12 of the light transmissive cover 10 increases. Similarly, the part of the light that reaches the first light sensor 22 after being reflected at the outer surface of the forward facing portion 12 of the light transmissive cover 10 increases as well.

When considering both the substantially constant reflection of light towards the second light sensor 24, as described above with respect to FIG. 6, and the increasing reflection of light towards the first light sensor 22 due to a progressing erosion of the forward facing portion 12 of the light transmissive cover 10, as described above with respect to FIG. 7, it can be appreciated that the spread between the sensor measurements of the first light sensor 22 and the second light sensor 24 increases with an increase in erosion. The relation between the sensor measurements of the first light sensor 22 and the second light sensor 24 may be monitored over time, and a highly reliable determination with respect to the extent of erosion of the light transmissive cover 10 may be obtained.

The increasing spread between the sensor measurements of the first light sensor 22 and the sensor measurements of the second light sensor 24 may be monitored in terms of ratio values or difference values of the sensor measurements of the first and second light sensors 22, 24. By looking at ratio values or difference values, the sensor measurements of the first and second light sensors 22, 24 may be combined into a single metric. Said single metric may then by compared to a suitable threshold value for determining whether the extent of erosion of the light transmissive cover 10 has reached a critical level, such as a level where the light transmissive cover 10 is to be replaced.

Basing the determination regarding the extent of erosion of the light transmissive cover 10 on ratio values or difference values of the sensor measurements of the first and second light sensors 22, 24 may additionally allow for eliminating or reducing the measurement uncertainty that may be created by different levels of ambient light and/or by stray light within the aircraft beacon light 2 and/or by light components of other origin and/or by light output variations due to aging of the light sources 4 and/or temporary light output reductions due to thermal stresses on the light sources 4. It may become possible to use measurement values, obtained un-der vastly different environmental conditions and/or at very different points in time, in a meaningful manner. The data basis for monitoring erosion of the light transmissive cover may be greatly increased.

The controller 50, as described above with respect to FIG. 3, may carry out above described evaluation of the sensor measurements of the first and second light sensors 22, 24. In particular, the controller 50 may store the sensor measurements and/or the ratio/difference values and may determine the extent of erosion from the time series of sensor measurements and/or ratio values and/or difference values. Further in particular, the controller 50 may monitor whether the ratio/difference values are above a worn cover threshold value for a predetermined erosion monitoring time interval, at least on average, and/or whether a predefined percentage of the ratio/difference values are above the worn cover threshold value within a predetermined erosion monitoring time interval. In this way, the controller 50 may ensure that the slow process of erosion of the light transmissive cover 10 is reliably monitored, while disregarding temporary disturbances of the sensor measurements, such as snow, excessive icing, dirt, light output reductions due to high operating temperatures of the light sources, or temporary sensor malfunctions.

The controller 50 may also carry out a degradation monitoring. In particular, the controller 50 may evaluate the sensor measurements of the second light sensor 24 over time and may deduce the level of degradation of the light sources 6 therefrom. With the sensor measurements of the second light sensor 24 being largely or fully independent of the erosion of the light transmissive cover 10, a highly reliable de-termination of the degradation/aging of the light sources 6 may be achieved.

Figure 8:
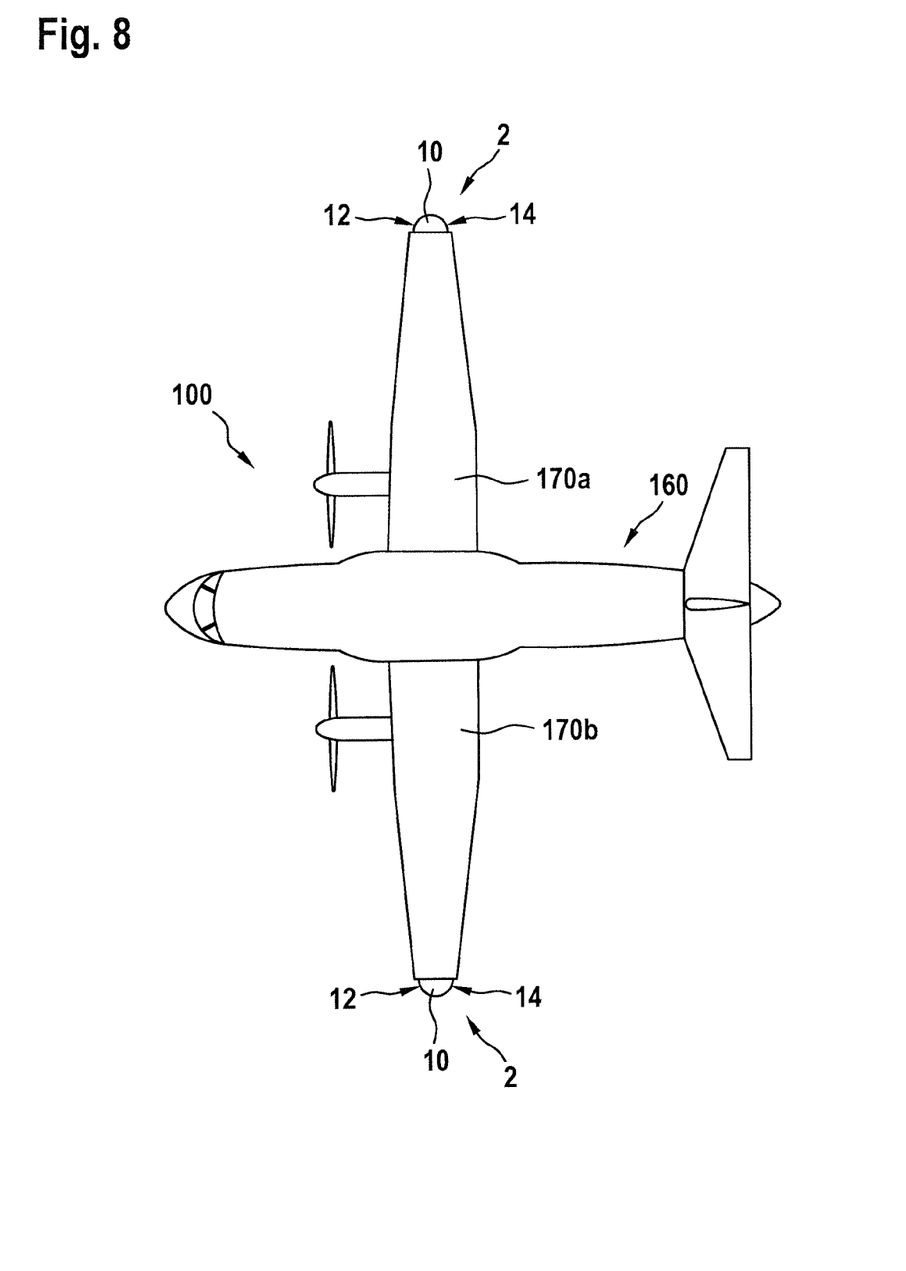
FIG. 8 shows a schematic top view of an aircraft according to another exemplary embodiment of the invention, which is equipped with two wing-end-mounted exterior aircraft lights according to exemplary embodiments of the invention.

FIG. 8 shows a schematic top view of an aircraft 100 according to an exemplary embodiment of the invention. In the exemplary embodiment of FIG. 8, the aircraft 100 is a smaller size airplane, such as a private airplane for recreational or sports purposes. In particular, the airplane may be an airplane of less than 20 passengers. The aircraft has a fuselage 160, a right wing 170a, and a left wing 170b. Each of the right and left wings 170a, 170b is equipped with a propeller engine.

Further, the aircraft 100 of FIG. 8 has two exterior aircraft lights 2 in accordance with exemplary embodiments of the invention. The exterior aircraft lights 2 are wing-end-mounted exterior aircraft lights and are provided on a left lateral end portion of the left wing 170b and a right lateral end portion of the right wing 170a. Each of the exterior aircraft lights 2 has a light transmissive cover 10, which is substantially circular in the top view of FIG. 8 and/or substantially circular in a horizontal cross-section. With this shape, the light transmissive cover 10 has a forward facing portion 12 and a rearward facing portion 14. The principles of obtaining sensor measurements with a first light sensor, oriented towards the forward facing portion 12, and a second light sensor, oriented towards the rearward facing portion 14, and of determining an extent of erosion of the light transmissive cover 10 on the basis of the sensor measurements of the first and second light sensors, as described above, are applicable to the exterior aircraft lights 2 of the aircraft 100 of FIG. 8 in an analogous manner. It is understood that the number, arrangement, and colors of light sources may be different in such an embodiment, as compared to the exterior aircraft light 2 of FIGS. 3 to 7.

In the exemplary embodiment of FIG. 8, the exterior aircraft lights 2 are combined navigation, white strobe anti-collision and red-flashing beacon lights. It is also possible that the exterior aircraft lights 2 have only one or any two of said functionalities.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An exterior aircraft light with cover erosion monitoring, the exterior aircraft light comprising:
   a support;
   at least one light source, arranged on the support;
   a light transmissive cover, arranged over the at least one light source, the light transmissive cover having a forward facing portion and a rearward facing portion;
   a first light sensor, arranged to receive light emitted by the at least one light source and reflected towards the first light sensor by the forward facing portion of the light transmissive cover; and
   a second light sensor, arranged to receive light emitted by the at least one light source and reflected towards the second light sensor by the rearward facing portion of the light transmissive cover;
   wherein the exterior aircraft light is configured to provide an indication regarding an extent of erosion of the light transmissive cover on the basis of sensor measurements of the first light sensor and sensor measurements of the second light sensor.

2. The exterior aircraft light according to claim 1, wherein the exterior aircraft light is configured to provide the indication regarding the extent of erosion of the light transmissive cover on the basis of ratio values of the sensor measurements of the first light sensor and the sensor measurements of the second light sensor.

3. The exterior aircraft light according to claim 2, wherein the exterior aircraft light is configured to provide a worn cover indication when the ratio values of the sensor measurements of the first light sensor and the sensor measurements of the second light sensor are above a worn cover threshold value.

4. The exterior aircraft light according to claim 3,
   wherein the exterior aircraft light is configured to provide the worn cover indication when the ratio values of the sensor measurements of the first light sensor and the sensor measurements of the second light sensor are on average above the worn cover threshold value within a predetermined erosion monitoring time interval;
   and/or
   wherein the exterior aircraft light is configured to provide the worn cover indication when at least a predefined percentage, such as 80%, of the ratio values of the sensor measurements of the first light sensor and the sensor measurements of the second light sensor are above the worn cover threshold value within a predetermined erosion monitoring time interval.

5. The exterior aircraft light according to claim 4, wherein the predetermined erosion monitoring time interval is between 1 week and 3 months, in particular between 2 weeks and 2 months.

6. The exterior aircraft light according to claim 3, wherein the worn cover threshold value is between 1.5 and 4.

7. The exterior aircraft light according to claim 1, wherein the exterior aircraft light is configured to provide the indication regarding the extent of erosion of the light transmissive cover on the basis of difference values of the sensor measurements of the first light sensor and the sensor measurements of the second light sensor.

8. The exterior aircraft light according to claim 1, further comprising:
   a first shutter, arranged over the first light sensor, wherein the first shutter has a first light entry port oriented towards the forward facing portion of the light transmissive cover;
   and/or
   a second shutter, arranged over the second light sensor, wherein the second shutter has a second light entry port oriented towards the rearward facing portion of the light transmissive cover.

9. The exterior aircraft light according to claim 8,
   wherein the first shutter encloses the first light sensor with the exception of the first light entry port;
   and/or
   wherein the second shutter encloses the second light sensor with the exception of the second light entry port.

10. The exterior aircraft light according to claim 1, wherein the exterior aircraft light is configured to provide an indication regarding an extent of degradation of the at least one light source on the basis of sensor measurements of the second light sensor.

11. The exterior aircraft light according to claim 1,
wherein the exterior aircraft light is a fuselage-mounted aircraft beacon light;
wherein the exterior aircraft light comprises a plurality of light sources, arranged on the support;
wherein the plurality of light sources are in particular arranged in an annular configuration on the support and wherein the first light sensor and the second light sensor are in particular arranged laterally outwards of the annular configuration of the plurality of light sources.

12. The exterior aircraft light according to claim 1,
wherein the exterior aircraft light is a wing-end-mounted exterior aircraft light,
wherein the exterior aircraft light is in particular a wing-end-mounted aircraft navigation light or a wing-end-mounted red-flashing beacon light or a wing-end-mounted white strobe anti-collision light or a wing-end-mounted multi-function light providing the functionalities of at least two of an aircraft navigation light, a red-flashing beacon light, and a white strobe anti-collision light.

13. An aircraft, such as an airplane or a rotorcraft, comprising the at least one exterior aircraft light according to claim 11, wherein the aircraft in particular comprises an upper fuselage-mounted aircraft beacon light, mounted to an upper portion of a fuselage of the aircraft, and/or a lower fuselage-mounted aircraft beacon light, mounted to a lower portion of the fuselage of the aircraft.

14. A method of monitoring erosion of a light transmissive cover of an exterior aircraft light having at least one light source, the method comprising:
obtaining first sensor measurements with a first light sensor, the first light sensor arranged to receive light emitted by the at least one light source and reflected by a forward facing portion of the light transmissive cover;
obtaining second sensor measurements with a second light sensor, the second light sensor arranged to receive light emitted by the at least one light source and reflected by a rearward facing portion of the light transmissive cover;
relating the first sensor measurements and the second sensor measurements; and
providing an indication regarding an extent of erosion of the light transmissive cover on the basis of said relating of the first sensor measurements and the second sensor measurements.

15. The method according to claim 14,
wherein said relating of the first sensor measurements and the second sensor measurements comprises determining ratio values of the first sensor measurements and the second sensor measurements; and
wherein the method in particular comprises providing a worn cover indication when the ratio values are above a worn cover threshold value.

\* \* \* \* \*